(12) United States Patent
Svensson et al.

(10) Patent No.: US 8,769,402 B2
(45) Date of Patent: Jul. 1, 2014

(54) METHOD FOR OPTIMISING THE PLACEMENT OF AT LEAST TWO PIECES OF INFORMATION

(75) Inventors: Jonas Svensson, Göteborg (SE); Leif Jagerbrand, Hindas (SE); Johan Hogberg, North York (CA); Björn Andersson, Göteborg (SE); Thomas Karlsson, Göteborg (SE); Ola Tiverman, Västra Frölunda (SE); Pierre Milburn, Angered (SE)

(73) Assignee: Admeta Aktiebolag, Gothenburg (SE)

( * ) Notice: Subject to any disclaimer, the term of this patent is extended or adjusted under 35 U.S.C. 154(b) by 358 days.

(21) Appl. No.: 13/254,248

(22) PCT Filed: Mar. 2, 2010

(86) PCT No.: PCT/SE2010/050239
§ 371 (c)(1),
(2), (4) Date: Mar. 19, 2012

(87) PCT Pub. No.: WO2010/101519
PCT Pub. Date: Sep. 10, 2010

(65) Prior Publication Data
US 2012/0169767 A1    Jul. 5, 2012

(30) Foreign Application Priority Data
Mar. 3, 2009 (SE) .................... 0900274

(51) Int. Cl.
*G06F 17/30* (2006.01)
*G06F 1/32* (2006.01)
*G06F 15/16* (2006.01)
*G06F 21/00* (2013.01)
*G06F 21/51* (2013.01)
*G06Q 30/00* (2012.01)
*G06Q 30/02* (2012.01)
*H04L 29/06* (2006.01)
*H04L 29/08* (2006.01)

(52) U.S. Cl.
CPC .............. *G06F 17/30* (2013.01); *G06F 1/3203* (2013.01); *G06F 15/16* (2013.01); *G06F 17/30321* (2013.01); *G06F 17/30389* (2013.01); *G06F 17/30424* (2013.01); *G06F 17/30979* (2013.01); *G06F 21/00* (2013.01); *G06F 21/51* (2013.01); *G06Q 30/00* (2013.01); *G06Q 30/02* (2013.01); *G06Q 30/0241* (2013.01); *G06Q 30/0251* (2013.01); *H04L 29/06* (2013.01); *H04L 65/1089* (2013.01); *H04L 65/403* (2013.01); *H04L 65/605* (2013.01); *H04L 67/00* (2013.01); *H04L 67/02* (2013.01); *H04L 67/06* (2013.01)
USPC ........................... 715/243; 715/234; 715/253

(58) Field of Classification Search
CPC ....... G06F 1/3203; G06F 15/16; G06F 17/30; G06F 17/30321; G06F 17/30389; G06F 17/30424; G06F 17/30979; G06F 21/00; G06F 21/51; G06Q 30/00; G06Q 30/02; G06Q 30/0241; G06Q 30/0251; H04L 2212/0025; H04L 29/06; H04L 65/1089; H04L 65/403; H04L 65/605; H04L 67/00; H04L 67/02; H04L 67/06
USPC ......................... 715/234, 243, 253
See application file for complete search history.

(56) References Cited

U.S. PATENT DOCUMENTS 5,999,912 A    12/1999  Wodarz
6,311,185 B1   10/2001  Markowitz (Continued)

OTHER PUBLICATIONS

European Search Report issued in European Application No. 10749017.9-2221/2404266 on Jan. 15, 2013, pp. 1-5.

(Continued)

*Primary Examiner* — Andrew Dyer

(74) *Attorney, Agent, or Firm* — Jeffrey S. Melcher; Manelli Selter PLLC

(57) ABSTRACT

Method for optimising the placement of at least two pieces of information in at least one display section of a display area managed by a system, wherein said system communicates with an Information Optimization Center through the sending and receiving of packets of instructions and/or requests, wherein said packets of instructions comprise data regarding a location of at least one piece of information and instructions regarding at least two pieces of information are sent in the same packet. The invention also relates to a system for optimising the placement of at least two pieces of information in at least one display section of a display area, comprising optimization means for selecting at least two pieces of information corresponding to at least one display section, wherein said system further comprises at least one packet of instructions regarding the selection of at least two pieces of information by said optimization means and said packet of instructions comprises data regarding a location of at least one piece of information and that instructions regarding at least two pieces of information are sent in the same packet of instructions.

17 Claims, 1 Drawing Sheet

(56) References Cited

U.S. PATENT DOCUMENTS

| | | | |
|---|---|---|---|
| 6,947,571 B1* | 9/2005 | Rhoads et al. | 382/100 |
| 7,715,448 B2* | 5/2010 | Cheng et al. | 370/528 |
| 7,970,891 B1* | 6/2011 | Kontothanssis et al. | 709/224 |
| 8,108,895 B2* | 1/2012 | Anderson et al. | 725/36 |
| 8,174,972 B2* | 5/2012 | Cernius et al. | 370/230 |
| 2002/0161648 A1* | 10/2002 | Mason et al. | 705/14 |
| 2003/0149937 A1 | 8/2003 | McElfresh | |
| 2004/0158858 A1* | 8/2004 | Paxton et al. | 725/42 |
| 2007/0287422 A1* | 12/2007 | Fartmann et al. | 455/411 |
| 2008/0033794 A1* | 2/2008 | Ou et al. | 705/14 |
| 2008/0097834 A1 | 4/2008 | McElfresh | |
| 2008/0281941 A1* | 11/2008 | Park et al. | 709/217 |
| 2008/0306815 A1 | 12/2008 | Dykes | |
| 2009/0055254 A1* | 2/2009 | Madhavan et al. | 705/14 |
| 2012/0130808 A1* | 5/2012 | Paz et al. | 705/14.52 |

OTHER PUBLICATIONS

International Search Report mailed Jun. 9, 2010 in PCT/SE2010/050239, pp. 1-4.

Written Opinion mailed Jun. 9, 2010 in PCT/SE2010/050239, pp. 1-8.

* cited by examiner

METHOD FOR OPTIMISING THE PLACEMENT OF AT LEAST TWO PIECES OF INFORMATION

CROSS-REFERENCE TO RELATED APPLICATIONS

This application is a national stage entry under 35 U.S.C. 371 of International Application No. PCT/SE2010/050239, filed 2 Mar. 2010, designating the United States. This application claims foreign priority under 35 U.S.C. 119 and 365 to Swedish Patent Application No. 0900274-2, filed 3 Mar. 2009. The complete contents of these applications are incorporated herein by reference.

TECHNICAL FIELD

The present invention relates to a method for optimising the placement of at least two pieces of information in at least one display section of a display area managed by a system, wherein said system communicates with an Information Optimisation Centre through the sending and receiving of packets of instructions and/or requests. The invention also relates to a system for optimising the placement of at least two pieces of information in at least one display section of a display area, comprising optimisation means for selecting at least two pieces of information corresponding to at least one display section.

BACKGROUND ART

The transfer of signals from a sender to a recipient is an integrated part of many fields of technology. Often, a large series of signals containing information is required between a number of sender and/or recipient units in order to perform certain tasks, and this places substantial demands on the capacity and energy needs of each unit. In order to transfer and process complex signals, the processor as well as the memory storage capacities need often be extensive and the unit will also need a large and continuous supply of electrical energy in order to function properly.

When the units are computers within a computer network or a single computer communicating with servers or the like, the size and number of signals in the form of requests and instructions that are needed for the desired operations are vast. For instance, when a software appliance such as a web browser is communicating with the internet, the information transfers needed in order to show a specific website often slows down the browser and places high demands on the computer software as well as on the internet connection, especially if the website in question also shows pop-up windows and advertisements. The constant sending of signals back and forth also requires a lot of electrical power, thereby increasing the cost in money as well as in time for the user. The loading time required to display a website on a screen, especially if the website shows a lot of information such as images and/or advertisements, is thereby made intolerably long, resulting in possible irritation or loss of interest from the user.

US2003/0149937 (McElfresh et al.) discloses a method and system for optimum placement of advertisements on a webpage, where the placement of a number of advertisements are chosen depending on properties such as cost-per-click for each advertisement. This document does not, however, disclose any method that can reduce the loading time of a webpage or make the display more efficient and convenient for the user.

The need for a faster and more cost efficient way for a browser to communicate with and display websites on the internet and is therefore apparent.

DISCLOSURE OF THE INVENTION

The object of the present invention is to eliminate or at least to minimise the problems described above. This is achieved through a method for optimising the placement of at least two pieces of information, according to claim 1, where the packets of instructions comprise data regarding a location of at least one piece of information and instructions regarding at least two pieces of information are sent in the same packet. Thereby, the number of requests and instructions that are needed for displaying information can be substantially reduced, resulting in a faster display and a more cost and energy efficient operation. By choosing all the pieces of information that are to be displayed together, the risk for undesirable effects that could be reached by combining different types of pieces is also minimised. Also, since the location of the pieces of information is transmitted along with the packet, the collecting of the actual pieces of information can be performed at a later stage, thus rendering the packets of instructions small and easily transmitted, thereby substantially reducing the time required for loading a particular page onto a computer of a user. It is therefore possible to collect only those pieces of information that are to be displayed close to the top of a webpage and to collect those that are to be shown further down at the time that the user scrolls the page in order to view the relevant sections, thus further decreasing the time required for loading and displaying a webpage to the user.

According to an aspect of the invention, said packet comprises information regarding all the pieces of information. Thereby, the number of requests and instructions can be further reduced, resulting in an even more beneficial operation.

According to another aspect of the invention, said pieces of information are selected by use of optimisation criteria. Thereby, the pieces of information that are considered the best at any given time can be shown in the display sections in order to optimise the display. The factors used to determine what is best can comprise data regarding the profitability of a specific piece of information, data regarding the user's preferences or the features of his or her computer, such as the operating system, the browser, the internet connection, or any other relevant feature.

According to yet another aspect of the invention, said at least one display section is divided into at least two subsections. Thereby, one or more pieces of information can be displayed in the display section, and these pieces of information can be selected depending on each other or independently.

According to a further aspect of the invention, said optimisation criteria comprise values assigned to the combination of different pieces of information. Thereby, the combination of the pieces of information that is considered the best can be displayed on the website at any given time, without risking that the combination itself is detrimental to any of the pieces of information.

According to yet another aspect of the invention, said Information Optimisation Centre sends renewed instructions to the display system at another time than the first instructions. Thereby, a new decision changing the pieces of information that are to be displayed in the display sections can be reached, and the pieces of information that are shown to a user can be exchanged for new ones if this is deemed to be better at a given time. The optimal display of information pieces can thereby be achieved.

BRIEF DESCRIPTION OF THE DRAWINGS

The invention will be described more in detail with reference to the appended drawings, where.

DETAILED DESCRIPTION OF THE INVENTION

Figure 1:
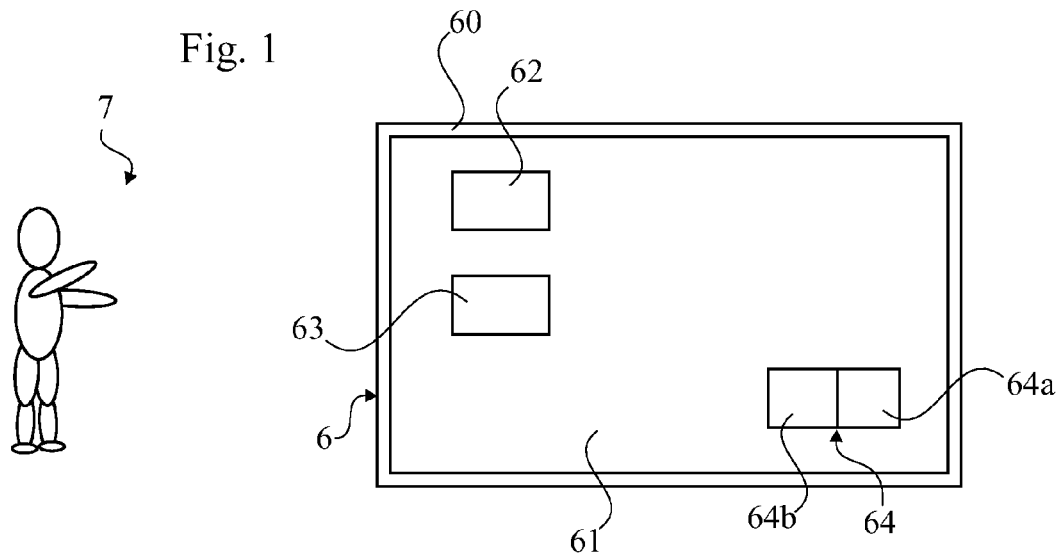
FIG. 1 shows a schematic view of a display system for displaying a website to a user.

FIG. 1 shows a schematic view of a display system for displaying a website to a user, where a computer 6 with a display area in the form of a window 61 on a computer screen 60 can display a website in order for it to be viewed by a user 7. The website can have a number of display sections in the form of fields 62, 63, 64 where pieces of information such as advertisements, comprising text, images and the like, can be displayed. The display system 1 can be in the form of a web browser.

The number of display sections 62, 63, 64, as well as their sizes and placement, can vary depending on the specific website. Each display section 62, 63, 64 might also be divided into a number of subsections 64a, 64b that can show different pieces of information.

Figure 2:
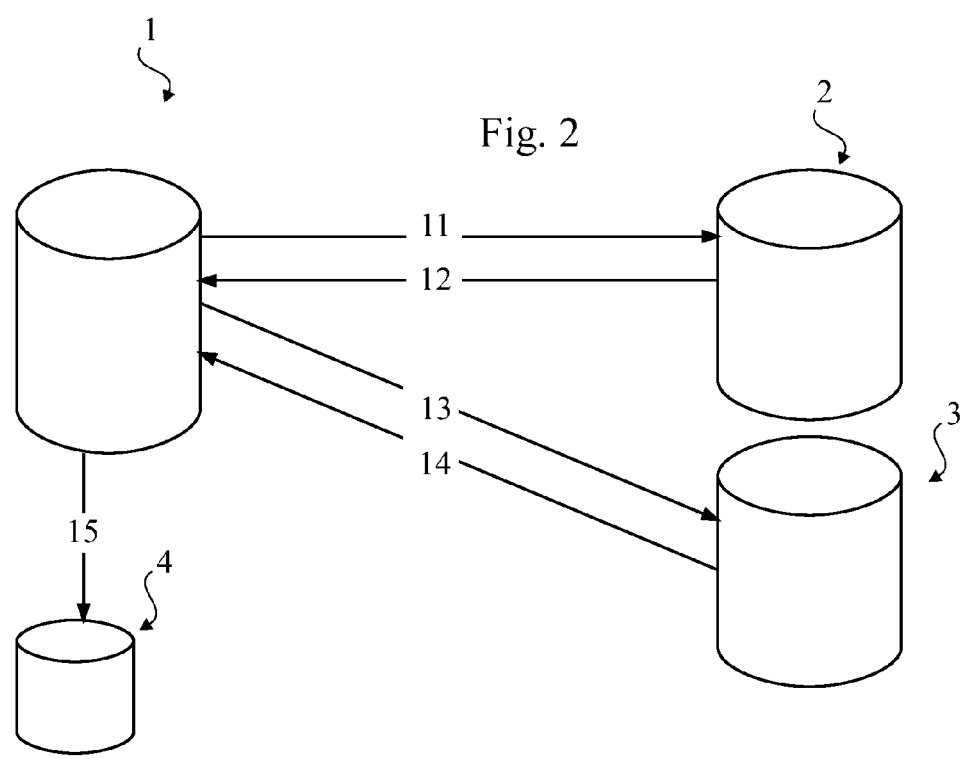
FIG. 2 shows a schematic view of a preferred embodiment of a system for optimising the placement and display of at least two pieces of information according to the invention.

FIG. 2 shows a system for optimising the placement and display of information according to a preferred embodiment of the present invention, where the display system 1 is shown schematically and the communication with other units 2, 3, 4 is illustrated. In order to display a website along with pieces of information in a number of display sections 62, 63, 64, the display system 1 can communicate with a publisher 2 in order to receive the website itself and information regarding the number and placement of the display sections 62, 63, 64 that belong to the particular website. Through communication with an Information Optimisation Centre 3, the pieces of information that are to be placed in each display section 62, 63, 64 are determined and can be collected from a storage area in the form of at least one server 4 and placed into the designated display sections 62, 63, 64 by the display system 1. The communication between the different units 1, 2, 3, 4 are performed by communication means such as electronically through internet connections.

The Information Optimisation Centre 3 comprises optimisation means for deciding based on a number of criteria which pieces of information are the best for placing on the website. The criteria can be the profitability of each piece of information, based on a click-through rate or the like, as well as the synergetic effects of placing any given piece of information together with any number of other pieces of information in order to determine the most efficient combination of information pieces for any given website. The features of the website itself, as well as information regarding the user at the display system 1, i.e. previous likes and dislikes at the viewing of other websites, and the features of the display system 1, such as the size of the display area 61 and the speed of the browser can also be used as criteria in the decision process. It would also be possible to have criteria based on the communication means, such as the speed and reliability of the connection between the display system 1 and the other units 2, 3, 4 in the system, or other features of the system that are deemed interesting.

The method according to the present invention will now be described with reference to the figures.

When the user 7 wants to view a website, he or she can request this from the display system 1, for instance by moving a cursor to a desired link displayed on a website that is currently shown in the display area 61 and clicking on this link, or by typing an address in the form of a URL in a section of the display area 61, or by any other suitable method. Once the display system 1 has received this instruction, it uses the communication means to send a request in the form of a packet of information 11 to a publisher 2 and in return receives instructions 12 comprising the website in question, also in the form of a packet of information. These instructions 12 also comprise the number and positions of display sections 62, 63, 64 where different pieces of information, for instance in the form of advertisements are to be shown to the user 7.

A packet is here defined as a unit of data comprising information regarding at least one piece of information. Said information can comprise identifying data that identifies a particular piece of information, location data that specifies a location where the actual piece of information can be found or data regarding different properties of a piece of information, for instance.

In order to identify and locate these pieces of information, the display system 1 sends another request 13 to an Information Optimisation Centre 3 and in turn receives a packet of instructions 14 that comprises information regarding at least two, but preferably all, of the pieces of information. This instruction comprises means for identifying which piece of information is meant to be placed into which display section 62, 63, 64, and also the location where they can be found by the display system 1, but does not comprise the actual pieces of information themselves.

Since the Information Optimisation Centre 3 receives information regarding all of the available display sections 62, 63, 64 at the same time, one decision is sufficient for determining which pieces of information that are to be displayed and where. Every individual piece of information can have a number of characteristics, specifying the value of it if displayed alone and the value if displayed together with all possible combinations of other pieces of information. At one time, the best (i.e. the most efficient or most profitable) decision could be to display different pieces of information in every display section, while at another time the best decision might be to show one piece of information more than once or to show nothing in one or more of the display sections in order to present the remaining pieces of information more clearly. It would also be possible that a combination of two or three pieces of information with moderate individual values have a higher profitability together than a single piece of information with very high value. The other way around is also a possibility, i.e. that only one piece of information is displayed, since this piece is better on its own than any combination of different pieces can be. In a display section 64 that is divided into subsections 64a, 64b, different pieces of information can be shown or, alternatively, the same piece can be displayed more than once.

After the decision has been made, the pieces of information that are to be displayed can be collected from their respective locations, such as a server or servers 4. If a particular piece of information has been displayed to the same user at an earlier time, it may have been stored in a cache on the user's computer and can in this event be retrieved from said cache. Thanks to the packet of instructions 14 giving the location for the pieces of information, they can thus be collected in an efficient manner and be displayed when required.

Since characteristics of the display system 1 itself, the communication means or the user 7 can also be used when making the decision, it would be possible to show, for instance, only information comprising images, or information with text only, if this corresponds to the users likes or dislikes, or if other factors indicate that the speed of the transfer and loading of a website is affected by the choice. The size of the display section 62, 63, 64 and the respective sizes of the available pieces of information can also be used for making the decision. In this way, the piece of information that fill the available space in the best way can be selected or a combination of different pieces used if this yields a better placement. If a display section 62, 63, 64 with an area of 500×3000 pixels is available, for instance, the possible combinations of information pieces that can fill this space is dependent on the possible size of each piece of information.

What is to be considered the best decision can be dependant, at least in part, on the objectives of the person or company that own the website that is displayed to the user 7 and on the cooperation between this person or company and the owners of the specific pieces of information that are to be displayed. By using the pieces of information that are considered the best for a specific user from the perspective of the person owning the website or the owners of the pieces of information, and by taking into consideration the preferences of the user himself or herself, the best decision for displaying information can thus be reached.

Thanks to the delivery of all this required information in one packet of instructions 14, the series of requests and instructions that would be necessary if the display system 1 were to find data regarding each piece of information separately can be omitted. Thereby, the display of a website together with the contents of the display sections 62, 63, 64 and subsections 64a, 64b can be performed in a significantly faster and more efficient manner, thus saving time and energy.

The display system 1 has now received the necessary information with the instruction 14 to know where every piece of information is to be displayed and where these pieces of information are currently located, in the event that they were not delivered from the Information Optimisation Centre 3 along with the packet of instructions 14. In case the pieces of information are currently located on one or more separate servers 4, the display system 1 sends the suitable number of requests 15 and in return receives the pieces of information themselves from the server or servers 4.

When a piece of information has been used once by the display system 1, it can be stored at a suitable place, such as the memory storage unit of a computer. In the future, when the same piece of information is to be used again, it can be collected from the storage unit in a simple and convenient manner, thus eliminating the need for sending the request 15 for this specific piece of information.

Once the pieces of information have reached the display system 1, the website can be displayed in the display area 61 along with the pieces of information in the display sections 62, 63, 64 in order for the entire webpage to be viewed by the user 7.

Since only one packet of instructions 14 comprising all the necessary information to identify, locate and place the pieces of information required for a specific website, the process of displaying the website to a user 7 can be made significantly quicker than if every piece of information required separate instructions that had to be gathered one at a time. Also, since the pieces of information can now be selected together, the best combination of pieces of information can be achieved.

The next time that the user 7 wants to view the same website again, new packets of instructions 14 regarding the pieces of information that are to be displayed might need to be sent to the display system 1. Thereby, the user 7 can be shown new pieces of information or new combination of such pieces every time that an already familiar website is viewed.

In order to further increase the benefits from displaying pieces of information in this manner, the Information Optimisation Centre 3 can monitor the displaying of the pieces of information. If a specific website has been shown for an extended period of time, the Information Optimisation Centre 3 can make a new decision and send new packets of instructions 14 in the form of at least one second packet of instructions 14', resulting in the displaying of new pieces of information. This second packet 14' is sent at a time that differs from that of the packet of instructions 14 and the interval between the sending of the packets 14, 14' is preferably longer than 3 s, more preferred longer than 10 s, even more preferred longer than 30 s. The display can thereby be refreshed with new pieces of information at the desired intervals.

When making this decision, all the factors and criteria described above can be used, as well as other factors that are beneficial in making the decision. The behaviour of the user 7 can also be used as a factor. Thus, if the user 7 has interacted with any of the pieces of information or has placed the cursor over one of them, for instance, new pieces of information related to the one that the user 7 has shown an interest for can be displayed.

The invention is not limited by the preferred embodiment described above, but can be varied within the scope of the appended claims. For instance, the computer can be any kind of device with the possibility of displaying text and/or images in a display area, and the browser for performing the displaying of the information can also be any kind of device suitable for displaying information, such as for instance an RSS feed. The pieces of information can be advertisements intended for a website, but can also be other types of information that is intended to be displayed in this manner or another.

The invention claimed is:

1. A method for optimising the placement of at least two advertisements on a screen managed by a display system, said method comprising:
   displaying a web browser on the screen;
   receiving an instruction to load a website;
   sending a website request packet of data to a publisher of the website;
   receiving, in packet form, website instruction data, the website instruction data including:
      at least two display sections of the website,
      a position of each display section on the screen, and
      an advertisement request for each display section;
   generating a single request packet comprising at least two of the advertisement requests, each advertisement request associated with a display section;
   sending the single request packet to a server;
   receiving a single display packet of data from the server, the single display packet comprising, for the at least two display sections:
      identifying data instructing which advertisement is to be placed in each of the at least two display sections, and
      location data that identify an ad server where each advertisement can be found;
   receiving a renewed single display packet of data more than three seconds after the time at which the first single display packet of data was received;
   sending an advertisement packet of data to one or more ad servers, the advertisement packet requesting an advertisement to be displayed in each display section;

receiving the requested advertisement from the ad server; and displaying each of the received advertisements in the display section associated with that advertisement.

2. The method according to claim 1, wherein said single display packet comprises identifying data and location data for all the display sections of the website.

3. The method according to claim 1, wherein said identifying data are selected by use of optimisation criteria.

4. The method according to claim 3, wherein said optimisation criteria comprise a profitability of an advertisement.

5. The method according to claim 3, wherein said optimisation criteria comprise at least one of a like and a dislike of a user.

6. The method according to claim 3, wherein said optimisation criteria comprise factors regarding a connection speed between the display system and an Information Optimisation Centre that receives the single request packet.

7. The method according to claim 3, wherein said optimisation criteria comprise data regarding the size of at least two display sections as compared to a size of the screen.

8. The method according to claim 1, wherein said at least two display sections are subjections of one display section.

9. A system comprising:
    a display system having:
        a processor;
        a screen in communication with the processor; and
        a memory storage in communication with the processor, the memory storage storing computer software executable by the processor to perform a method for placing advertisements on the screen, the method comprising:
            displaying a web browser on the screen;
            receiving an instruction to load a website;
            sending a website request packet of data to a publisher of the website;
            receiving, in packet form, website instruction data, the website instruction data including:
                at least two display sections of the website,
                a position of each display section on the screen, and
                an advertisement request for each display section;
            generating a single request packet comprising at least two of the advertisement requests, each advertisement request associated with a display section;
            sending the single request packet to a server;
                receiving a single display packet of data from the server, the single display packet comprising, for the at least two display sections:
                    identifying data instructing which advertisement is to be placed in each of the at least two display sections, and
                    location data that identify an ad server where each advertisement can be found;

receiving a renewed single display packet of data more than three seconds after the time at which the first single display packet of data was received;
                sending an advertisement packet of data to one or more ad servers, the advertisement packet requesting an advertisement to be displayed in each display section;
                receiving the requested advertisement from the ad server; and
                displaying each of the received advertisements in the display section associated with that advertisement.

10. The system according to claim 9, wherein said single request packet comprises identifying data and location data regarding all advertisements that correspond to the available display sections.

11. The system of claim 9, further comprising an Information Optimisation Centre (IOC) in communication with the display system via a network, the IOC comprising:
    an IOC processor;
    an IOC memory storage in communication with the IOC processor; and
    an IOC server in communication with the IOC processor and the display system;
the IOC memory storage storing computer software executable by the IOC processor to perform an IOC method comprising:
    receiving the single request packet from the display system;
    extracting the advertising requests for at least two display sections from the single request packet;
    choosing an advertisement to be displayed in each of the at least two display sections;
    generating the single display packet including the location data for each advertisement and the data identifying which advertisement is to be placed in each of the two or more display systems; and sending the single display packet to the display system.

12. The system according to claim 11, wherein choosing comprises using at least one optimisation criterion.

13. The system according to claim 12, wherein said optimisation criterion includes information regarding a user of the display system.

14. The system of claim 12, wherein the optimisation criterion includes a click-through rate of an advertisement.

15. The system of claim 12, wherein the IOC method further comprises:
    sending a first single display packet at a first time; and
    sending a second single display packet at least three seconds after the first single display packet.

16. The system of claim 12, wherein the optimisation criterion includes a speed of a connection between the display system and the Information Optimisation Centre.

17. The system of claim 12, wherein the optimisation criterion includes a reliability of a connection between the display system and the Information Optimisation Centre.

* * * * *